(12) United States Patent
Kim

(10) Patent No.: US 12,001,830 B2
(45) Date of Patent: Jun. 4, 2024

(54) DEVICE AND METHOD FOR CONTROLLING UPDATE OF VEHICLE

(71) Applicants: Hyundai Motor Company, Seoul (KR); Kia Corporation, Seoul (KR)

(72) Inventor: You Keun Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 102 days.

(21) Appl. No.: 17/745,303

(22) Filed: May 16, 2022

(65) Prior Publication Data

US 2023/0028274 A1 Jan. 26, 2023

(30) Foreign Application Priority Data

Jul. 22, 2021 (KR) .................. 10-2021-0096659

(51) Int. Cl.
*G06F 8/65* (2018.01)
*G07C 5/00* (2006.01)
*H04L 67/00* (2022.01)
*H04L 67/12* (2022.01)

(52) U.S. Cl.
CPC .............. *G06F 8/65* (2013.01); *G07C 5/008* (2013.01); *H04L 67/12* (2013.01); *H04L 67/34* (2013.01)

(58) Field of Classification Search
CPC .......... G06F 8/65; G07C 5/008; H04L 67/12; H04L 67/34
See application file for complete search history.

(56) References Cited

U.S. PATENT DOCUMENTS

| | | | | |
|---|---|---|---|---|
| 9,529,584 | B2* | 12/2016 | Eling | G06F 8/656 |
| 9,606,790 | B2* | 3/2017 | Throop | G06F 16/955 |
| 2013/0197712 | A1* | 8/2013 | Matsuura | G06F 11/3013 |
| | | | | 701/1 |
| 2013/0294262 | A1* | 11/2013 | Jose | H04L 1/0009 |
| | | | | 370/252 |
| 2014/0380296 | A1* | 12/2014 | Pal | G06F 8/65 |
| | | | | 717/171 |
| 2017/0322791 | A1* | 11/2017 | Tiles | G06F 8/65 |
| 2018/0272964 | A1* | 9/2018 | Netter | G06F 8/65 |
| 2019/0087169 | A1* | 3/2019 | Arai | G06F 11/00 |
| 2019/0212997 | A1* | 7/2019 | Sangameswaran | H04L 67/52 |
| 2021/0081192 | A1* | 3/2021 | Jeong | G06F 8/658 |
| 2021/0182049 | A1* | 6/2021 | Harata | G06F 8/65 |
| 2021/0303056 | A1* | 9/2021 | Peterson | G06F 1/324 |
| 2022/0179638 | A1* | 6/2022 | Lee | B60L 58/12 |
| 2022/0334822 | A1* | 10/2022 | Sakakibara | G06F 8/65 |

* cited by examiner

*Primary Examiner* — Douglas M Slachta
(74) *Attorney, Agent, or Firm* — Fox Rothschild LLP

(57) ABSTRACT

A device and a method for controlling an update of a vehicle are configured to control an over-the-air (OTA) update of the vehicle. The device is disposed in the vehicle performing the OTA update to obtain information on a state of charge of a battery of the vehicle, transmit information on the OTA update to an update target device, and adjust a transmission time interval between data of the information on the OTA update transmitted to the update target device. The present disclosure can prevent a situation in which starting of the vehicle is impossible because of a lack of a capacity of the battery after performing the OTA update.

18 Claims, 7 Drawing Sheets

DEVICE AND METHOD FOR CONTROLLING UPDATE OF VEHICLE

CROSS-REFERENCE TO RELATED APPLICATION

This application claims under 35 U.S.C. § 119(a) the benefit of Korean Patent Application No. 10-2021-0096659, filed in the Korean Intellectual Property Office on Jul. 22, 2021, the entire contents of which are incorporated herein by reference.

BACKGROUND

(a) Technical Field

The present disclosure relates to a device and a method for controlling an update of a vehicle, more particularly, to the device and method for controlling the update of the vehicle configured to control an over-the-air (OTA) update of the vehicle.

Background

An over-the-air (OTA) update is a method that enables convenient updating in a process of updating software of an electronic device mounted on a vehicle. In the OTA update, information on the update is received from an OTA update server through a communication module outside the vehicle, and the information on the update is transmitted to an update target controller through a communication control module inside the vehicle. In addition, when the update fails, the original software is restored.

When the electronic device of the vehicle is updated using the OTA scheme, the OTA update is performed in a key-off state. When performing the OTA update in the key-off state, power of a battery of the vehicle is used. After the OTA update is completed, a residual capacity of the battery sufficient for starting of the vehicle must remain. In particular, when the battery is aged or when battery performance deteriorates in the winter, it may be impossible to start the vehicle after performing the OTA update, so that it is necessary to develop a technology to solve such a problem.

SUMMARY

An aspect of the present disclosure provides a device and a method for controlling an update of a vehicle that controls an over the air (OTA) update of the vehicle.

Another aspect of the present disclosure provides a device and a method for controlling an update of a vehicle for preventing a situation in which starting of the vehicle is impossible because of a lack of a capacity of a battery after performing an OTA update.

Another aspect of the present disclosure provides a device and a method for controlling an update of a vehicle for managing a residual capacity of a battery when performing the update in a situation in which the battery is aged or a battery performance deteriorates in winter.

Another aspect of the present disclosure provides a device and a method for controlling an update of a vehicle that solve a problem that an efficiency of an OTA update may decrease because an OTA entry condition is not satisfied when a battery residual capacity value is increased during the OTA update.

Another aspect of the present disclosure provides a device and a method for controlling update of a vehicle that may solve a problem that starting of the vehicle is impossible after an OTA update is completed only by modifying software without changing hardware.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for controlling an update of a vehicle includes a sensor disposed in the vehicle performing an over-the-air (OTA) update, wherein the sensor obtains information on a state of charge of a battery of the vehicle, and a controller that transmits information on the OTA update to an update target device, and adjusts a transmission time interval between data of the information on the OTA update transmitted to the update target device.

In one implementation, the controller may reduce the transmission time interval as the state of charge of the battery is reduced.

In one implementation, the controller may adjust the transmission time interval based on the state of charge of the battery identified in real time while the OTA update is performed in a key-off state of the vehicle.

In one implementation, the controller may adjust the transmission time interval while the OTA update is performed in a key-off state of the vehicle based on the state of charge of the battery of the vehicle expected at a time point of completion of the OTA update.

In one implementation, the controller may calculate the state of charge of the battery of the vehicle expected at the time point of the completion of the OTA update based on a current state of charge of the battery of the vehicle, a current consumed for the OTA update, and an expected time required for the OTA update.

In one implementation, the controller may determine whether starting of the vehicle is possible at a time point of completion of the OTA update through the state of charge of the battery before the OTA update is performed, and determine whether the OTA update is able to be performed based on whether the starting of the vehicle is possible after the OTA update is completed.

In one implementation, the controller may determine whether to stop the OTA update based on the state of charge of the battery identified in real time while the OTA update is performed in a key-off state of the vehicle, or the state of charge of the battery of the vehicle expected at a time point of completion of the OTA update.

In one implementation, the controller may transmit the information on the OTA update including ROM data to the update target device through background transmission before the OTA update is performed, and adjust the transmission time interval based on the state of charge of the battery identified in real time when the vehicle comes into a key-off state during the transmission of the information on the OTA update.

In one implementation, the controller may determine whether the state of charge of the battery of the vehicle expected at a time point of completion of the OTA update is greater than or equal to a preset reference value after the transmission of the information on the OTA update through the background transmission is completed, and set a memory of the update target device where the ROM data is stored as an operating memory of the vehicle when the state of charge of the battery of the vehicle is greater than or equal to the preset reference value.

In one implementation, the controller may determine whether to stop the OTA update based on the state of charge of the battery when the OTA update is performed using difference data stored in the update target device.

In one implementation, the controller may stop the OTA update when the state of charge of the battery is lower than a preset reference value when the OTA update is performed using the difference data stored in the update target device.

According to another aspect of the present disclosure, a method for controlling an update of a vehicle includes obtaining, by a sensor disposed in the vehicle performing OTA update, information on a state of charge of a battery of the vehicle, and transmitting, by a controller, information on the OTA update to an update target device, and adjusting a transmission time interval between data of the information on the OTA update transmitted to the update target device.

In one implementation, the adjusting, by the controller, of the transmission time interval between the data of the information on the OTA update transmitted to the update target device may include reducing, by the controller, the transmission time interval as the state of charge of the battery is reduced.

In one implementation, the adjusting, by the controller, of the transmission time interval between the data of the information on the OTA update transmitted to the update target device may include adjusting, by the controller, the transmission time interval based on the state of charge of the battery identified in real time while the OTA update is performed in a key-off state of the vehicle, or the state of charge of the battery of the vehicle expected at a time point of completion of the OTA update.

In one implementation, the method may further include calculating, by the controller, the state of charge of the battery of the vehicle expected at the time point of the completion of the OTA update based on a current state of charge of the battery of the vehicle, a current consumed for the OTA update, and an expected time required for the OTA update.

In one implementation, the method may further include determining, by the controller, whether starting of the vehicle is possible at a time point of completion of the OTA update through the state of charge of the battery before the OTA update is performed, and determining, by the controller, whether the OTA update is able to be performed based on whether the starting of the vehicle is possible after the OTA update is completed.

In one implementation, the method may further include determining, by the controller, whether to stop the OTA update based on the state of charge of the battery identified in real time while the OTA update is performed in a key-off state of the vehicle, or the state of charge of the battery of the vehicle expected at a time point of completion of the OTA update.

In one implementation, the adjusting, by the controller, of the transmission time interval between the data of the information on the OTA update transmitted to the update target device may include transmitting, by the controller, the information on the OTA update including ROM data to the update target device through background transmission before the OTA update is performed, and adjusting the transmission time interval based on the state of charge of the battery identified in real time when the vehicle comes into a key-off state during the transmission of the information on the OTA update.

In one implementation, the method may further include determining, by the controller, whether the state of charge of the battery of the vehicle expected at a time point of completion of the OTA update is greater than or equal to a preset reference value after the transmission of the information on the OTA update through the background transmission is completed, and setting, by the controller, a memory of the update target device where the ROM data is stored as an operating memory of the vehicle when the state of charge of the battery of the vehicle is greater than or equal to the preset reference value.

In one implementation, the method may further include determining, by the controller, whether to stop the OTA update based on the state of charge of the battery when the OTA update is performed using difference data stored in the update target device.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
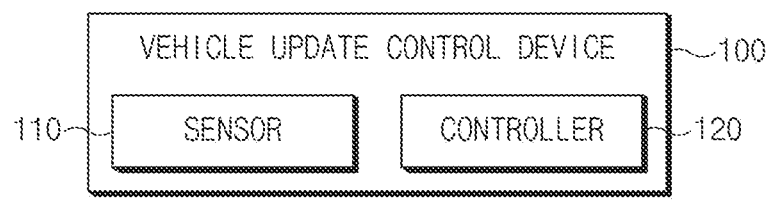
FIG. 1 is a block diagram showing a vehicle update control device according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in detail with reference to FIGS. 1 to 7.

FIG. 1 is a block diagram showing a vehicle update control device according to an embodiment of the present disclosure.

Referring to FIG. 1, a vehicle update control device 100 may include a sensor 110 and a controller 120.

The sensor 110 may be equipped in a vehicle that performs over-the-air (OTA) update, and may obtain information on a state of charge (SoC) of a battery of the vehicle.

For example, the sensor 110 may be equipped on the battery of the vehicle to measure the state of charge of the battery.

For example, the sensor 110 may obtain information indicating the state of charge of the battery in a percentage, and transmit the information to the controller 120.

For example, the sensor 110 may be connected to the controller 120 through wireless or wired communication, and may directly or indirectly transmit the information on the state of charge of the battery to the controller 120.

The controller 120 may perform overall control such that each of the components may normally perform a function thereof. Such controller 120 may be implemented in a form of hardware, software, or a combination of the hardware and the software. Preferably, the controller 120 may be implemented as a microprocessor, but may not be limited thereto. In addition, the controller 120 may perform various data processing, calculations, and the like, which will be described later.

The controller 120 may transmit information on an over-the-air (OTA) update to an update target device, and adjust a transmission time interval (STMin, Separation Time Min) between data of the information on the OTA update transmitted to the update target device based on the state of charge of the battery.

For example, the controller 120 may collectively control internal communication of the vehicle.

For example, the controller 120 may control controller area network (CAN) communication, CAN with flexible data rate (CAN-FD) communication, Ethernet communication, and the like connected inside the vehicle to transmit the information on the update to the OTA update target device.

For example, the information on the OTA update transmitted by the controller 120 to the update target device may include information transmitted to the update target device in a process of updating the update target device through ROM data downloaded in advance from an OTA update server and stored in a memory connected to the controller 120 when the OTA update uses a default scheme.

For example, the information on the OTA update transmitted by the controller 120 to the update target device may include the ROM data downloaded from the OTA update server and transmitted to the update target device when the OTA update uses a memory duplication scheme.

For example, the controller 120 may reduce the transmission time interval as the state of charge of the battery is low.

For example, the controller 120 may determine whether the state of charge of the battery obtained from the sensor 110 corresponds to a certain section based on a preset transmission time interval for each battery state of charge section, and adjust the transmission time interval between the data of the information on the OTA update with a transmission time interval corresponding to the corresponding battery state of charge section.

In this connection, the lower the battery state of charge in the section, the smaller the preset transmission time interval for each battery state of charge section.

For example, the controller 120 may reduce the transmission time interval to shorten a time for performing the update and reduce a capacity of the battery used for the update.

For example, the controller 120 may adjust the transmission time interval based on the state of charge of the battery identified in real time while the OTA update is performed in a key-off state of the vehicle.

For example, the controller 120 may obtain information on whether the vehicle is in the key-off state through the internal communication of the vehicle.

For example, the controller 120 may adjust the transmission time interval based on whether the state of charge of the battery identified in real time while the OTA update is performed exceeds a preset reference value.

As another example, the controller 120 may adjust the transmission time interval based on a transmission time interval corresponding to a section corresponding to the state of charge of the battery identified in real time while the update is performed among the preset battery state of charge sections.

For example, the controller 120 may adjust the transmission time interval while the OTA update is performed in the key-off state of the vehicle based on a state of charge of the battery of the vehicle expected at a time point of completion of the OTA update.

For example, when the OTA update uses the default scheme of updating the update target device through the ROM data stored in the memory connected to the controller 120, the controller 120 may adjust the transmission time interval of the information transmitted to the update target device in the update process based on the state of charge of the battery of the vehicle expected at the time point of the completion of the OTA update.

For example, the controller 120 may calculate the state of charge of the battery of the vehicle expected at the time point of the completion of the OTA update based on a current state of charge of the battery of the vehicle, a current consumed in the OTA update, and an expected time required for the OTA update.

For example, the controller 120 may calculate the state of charge of the battery of the vehicle expected at the time point of the completion of the OTA update by subtracting a capacity of the battery consumed when outputting the current consumed in the OTA update diming the expected time required for the OTA update from the current state of charge of the battery of the vehicle.

For example, the controller 120 may determine whether starting of the vehicle is possible at the time point of the completion of the OTA update through the state of charge of the battery before the OTA update is performed, and determine whether the OTA update is able to be performed based on whether the starting of the vehicle is possible after the OTA update is completed.

For example, when the state of charge of the battery at the time point of the completion of the OTA update calculated before the OTA update is performed exceeds the reference value, the controller 120 may determine that the starting of the vehicle is possible at the time point of the completion of the OTA update. In addition, when the state of charge of the battery at the time point of the completion of the OTA update calculated before the OTA update is performed does not exceed the reference value, the controller 120 may determine that the starting of the vehicle is impossible at the time point of the completion of the OTA update.

For example, when it is determined that the starting of the vehicle is possible at the time point of the completion of the OTA update, the controller 120 may determine that it is possible to perform the OTA update. In addition, when it is determined that the starting of the vehicle is impossible at the time point of the completion of the OTA update, the controller 120 may determine that it is impossible to perform the OTA update.

For example, the controller 120 may determine whether to stop the OTA update based on the state of charge of the battery identified in real time while the OTA update is performed in the key-off state of the vehicle, or the state of charge of the battery of the vehicle expected at the time point of the completion of the OTA update.

For example, when the state of charge of the battery identified in real time while the OTA update is performed is lower than the reference value, or when the state of charge of the battery of the vehicle expected at the time point of the completion of the OTA update is lower than the reference value, the controller 120 may determine to stop the OTA update and stop the OTA update.

For example, the controller 120 may transmit the information on the OTA update including the ROM data to the update target device through background transmission before the OTA update is performed, and when the vehicle is in the key-off state during the transmission of the information on the OTA update, may adjust the transmission time interval based on the state of charge of the battery that is identified in real-time.

For example, when the OTA update uses the memory duplication scheme, the controller 120 may transmit the information on the OTA update including the OTA update ROM data received from the OTA server to the update target device through background communication when the vehicle is in an ignition on state.

In this connection, when the vehicle comes into the key-off state while transmitting the information on the OTA update including the ROM data to the update target device through the background communication, the controller 120 may maintain the transmission of the information on the OTA update including the ROM data.

When the transmission of the information on the OTA update including the ROM data is maintained in the key-off state of the vehicle, the controller 120 may adjust the transmission time interval based on the state of charge of the battery identified in real time, thereby reducing battery consumption such that the vehicle may be started even after the background transmission is completed.

For example, as the state of charge of the battery identified in real time is low, the controller 120 may reduce the transmission time interval of the information on the OTA update including the ROM data that is transmitted to the update target device through the background transmission.

For example, after the transmission of the information on the OTA update through the background transmission is completed, the controller 120 may determine whether the state of charge of the battery of the vehicle expected at the time point of the completion of the OTA update is equal to higher than the preset reference value, and when the state of charge of the battery of the vehicle is greater than or equal to the preset reference value, set a memory of the update target device in which the ROM data is stored as an operating memory of the vehicle.

For example, when the OTA update uses the memory duplication scheme, and when the state of charge of the battery of the vehicle is equal to higher than the preset reference value after the transmission of the information on the OTA update including the ROM data to the update target device is completed, the controller 120 may determine that the vehicle may be started even after the OTA update is completed and set the memory of the update target device in which the ROM data is stored as the operating memory, thereby allowing the OTA update of the update target device to be performed in the key-off state of the vehicle.

For example, when the OTA update is performed using difference data stored in the update target device, the controller 120 may determine whether to stop the OTA update based on the state of charge of the battery.

When the OTA update uses a differential scheme, the update target device may perform the OTA update by itself using the difference data stored in the update target device, and the controller 120 may determine whether to stop the OTA update based on the state of charge of the battery to prevent the phenomenon in which the starting of the vehicle is impossible after the update target device performs the OTA update by itself using the difference data.

For example, when the OTA update is performed using the difference data stored in the update target device, the controller 120 may stop the OTA update when the state of charge of the battery is lower than the preset reference value.

For example, when the OTA update uses the differential method, the controller 120 may transmit an OTA update stop command to the update target device when the state of charge of the battery is lower than the preset reference value.

For example, when the OTA update uses the differential scheme, the controller 120 may determine whether the state of charge of the battery is lower than the preset reference value, or the update target device may determine whether the state of charge of the battery is lower than the preset reference value after the controller 120 transmits information on the state of charge of the battery to the update target device.

Figure 2:
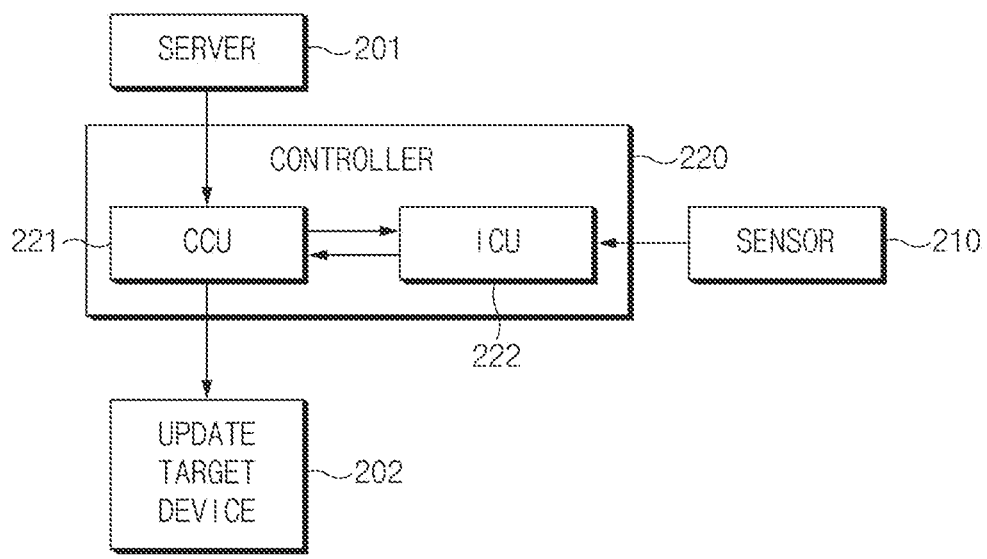
FIG. 2 is a diagram showing a specific configuration of a vehicle update control device according to an embodiment of the present disclosure.

FIG. 2 is a diagram showing a specific configuration of a vehicle update control device according to an embodiment of the present disclosure.

Referring to FIG. 2, a controller 220 may include a CCU (communication control unit) 221 and an ICU (integrated central control unit) 222.

The CCU 221 may receive the ROM data for the OTA update from a server 201.

For example, the CCU 221 may receive the data from the server 201 through an external communication module of the vehicle.

For example, the CCU 221 may be connected to the ICU 222 through the internal communication of the vehicle to transmit and receive various information.

For example, the CCU 221 may transmit the information on the update to an update target device 202 through the internal communication of the vehicle.

For example, the ICU 222 may receive the information on the state of charge of the battery from a sensor 210 through the internal communication of the vehicle.

For example, the OTA update of the vehicle may include update through the default scheme in which the CCU 221 downloads ROM package data for the OTA update and current ROM data for restoring software before the update when the update fails from the server 201, stores the downloaded data in a memory of the CCU 221, and performs the OTA update when the vehicle is in the key-off state.

As another example, the OTA update of the vehicle may include update through the memory duplication scheme in which the CCU 221 downloads the ROM package data for the OTA update from the server 201 and transmits the ROM package data to the update target device 202 without storing the ROM package data in the memory of the CCU 221, and the update target device 202 performs the OTA update by itself through the ROM data stored in a memory of the update target device 202 when the vehicle is in the key-off state.

As another example, the OTA update of the vehicle may include update through a memory duplication differential scheme in which the CCU 221 downloads the ROM package data for the OTA update from the server 201 and transmits the ROM package data to the update target device 202, and the update target device 202 performs the OTA update by itself using difference data stored in the memory of the update target device 202.

The present disclosure will describe in turn methods for increasing a performance of the OTA update for the default scheme, the memory duplication scheme, and the memory duplication differential scheme.

First, the case in which the OTA update of the vehicle uses the default scheme will be described.

When the OTA update of the vehicle uses the default scheme, the CCU 221 may download the ROM package data for the OTA update and the current ROM data for restoring the software before the update when the update fails from the server 201.

The CCU 221 may transmit information on a time required for the update to the ICU 222.

The ICU 222 may determine whether it is possible to perform the OTA update based on the time required for the update, the current consumed for the update, and the current state of charge of the battery, and transmit information on whether the OTA update is able to be performed and the state of charge of the battery to the CCU 221.

The CCU 221 may update the update target device 202 by communicating with the update target device 202 through the ROM data stored in the memory of the CCU 221.

In this connection, the CCU 221 may adjust the transmission time interval between the data of the information on the update transmitted to the update target device 202 based on the state of charge of the battery.

When the state of charge of the battery is lower than the reference value or the state of charge of the battery expected at the time point of the completion of the update is lower than the reference value, the CCU 221 may adjust the state of charge of the battery by reducing the transmission time interval between the data, thereby increasing an efficiency in terms of the time required to complete the update compared to the method of stopping the update and restoring the original software.

For example, when the state of charge of the battery is greater than or equal to 65%, the CCU 221 may set the transmission time interval between the data of the information on the update transmitted to the update target device 202 to 2.0 ms.

For example, when the state of charge of the battery is greater than or equal to 60% and lower than 65%, the CCU 221 may set the transmission time interval between the data of the information on the update transmitted to the update target device 202 to 1.5 ms.

For example, when the state of charge of the battery is lower than 60%, the CCU 221 may set the transmission time interval between the data of the information on the update transmitted to the update target device 202 to 1.0 ms.

In this connection, the state of charge of the battery may include the current state of charge of the battery and a predicted value of the state of charge of the battery at the time point of the completion of the update.

The sections of the state of charge of the battery are arbitrarily set to the section greater than or equal to 65%, the section greater than or equal to 60% and lower than 65%, and a section lower than 60% to give an example. In practice, the sections of the state of charge of the battery may be set to sections of different ranges.

In addition, the transmission time intervals between the data corresponding to the sections are arbitrarily set to 2.0 ms, 1.5 ms, and 1.0 ms, respectively, to give an example. In practice, the transmission time intervals may be set to other time intervals.

Next, the case in which the OTA update of the vehicle uses the memory duplication scheme will be described.

When the OTA update of the vehicle uses the memory duplication scheme, the CCU 221 may download the ROM package data for the OTA update and the current ROM data for restoring the software before the update when the update fails from the server 201 in the ignition on state of the vehicle.

In this connection, unlike the default scheme, the CCU 221 may not store the ROM data in the memory of the CCU 221.

The CCU 221 may transmit information on a time required for the process of the background transmission of the ROM data to the update target device 202 to the ICU 222.

The ICU 222 may transmit the information on the state of charge of the battery to the CCU 221.

The CCU 221 may transmit the ROM data downloaded from the server 201 to the update target device 202 through the background transmission.

In this connection, the CCU 221 may adjust the transmission time interval between the data of the ROM data transmitted to the update target device 202 based on the state of charge of the battery when the vehicle is in the key-off state during the background transmission.

When the state of charge of the battery is lower than the reference value or the state of charge of the battery expected at the time point of the completion of the update is lower than the reference value, the CCU 221 may adjust the state of charge of the battery by reducing the transmission time interval between the data, thereby preventing the situation in which the starting of the vehicle is impossible after the background transmission is completed as the vehicle comes into the key-off state during the background transmission.

For example, when the state of charge of the battery is greater than or equal to 65%, the CCU 221 may set the transmission time interval between the data of the ROM data background transmitted to the update target device 202 to 2.0 ms.

For example, when the state of charge of the battery is greater than or equal to 60% and lower than 65%, the CCU 221 may set the transmission time interval between the data of the ROM data that is transmitted in the background to the update target device 202 to 1.5 ms.

For example, when the state of charge of the battery is lower than 60%, the CCU 221 may set the transmission time interval between the data of the ROM data that is transmitted in the background to the update target device 202 to 1.0 ms.

In this connection, the state of charge of the battery may include the current state of charge of the battery.

The sections of the state of charge of the battery are arbitrarily set to the section greater than or equal to 65%, the section greater than or equal to 60% and lower than 65%, and the section lower than 60% to give an example. In practice, the sections of the state of charge of the battery may be set to the sections of the different ranges.

In addition, the transmission time intervals between the data corresponding to the sections are arbitrarily set to 2.0 ms, 1.5 ms, and 1.0 ms, respectively, to give an example. In practice, the transmission time intervals may be set to other time intervals.

When the predicted value of the state of charge of the battery at the time point of the completion of the OTA update is greater than or equal to the preset reference value after the background transmission is completed, the CCU 221 may change the operating memory of the vehicle to the memory of the update target device 202 in which the ROM data is stored through swap.

Finally, the case in which the OTA update of the vehicle uses the memory duplication differential scheme will be described.

When the OTA update of the vehicle uses the memory duplication scheme, the CCU 221 may download the ROM data for the OTA update from the server 201 in the ignition on state of the vehicle, and transmit the ROM data to the update target device 202.

For example, the CCU 221 may determine whether the state of charge of the battery is lower than the reference value based on the information on the state of charge of the battery received from the ICU 222, and when the state of charge of the battery becomes lower than the reference value while the update target device 202 is performing the update through the difference data stored in the memory of the update target device 202 by itself, transmit the update stop command to the update target device 202.

As another example, the CCU 221 may transmit the information on the state of charge of the battery received from the ICU 222 to the update target device 202, and when the state of charge of the battery becomes lower than the reference value while the update target device 202 is performing the update through the difference data stored in the memory of the update target device 202 by itself, stop the update by itself.

Figure 3:
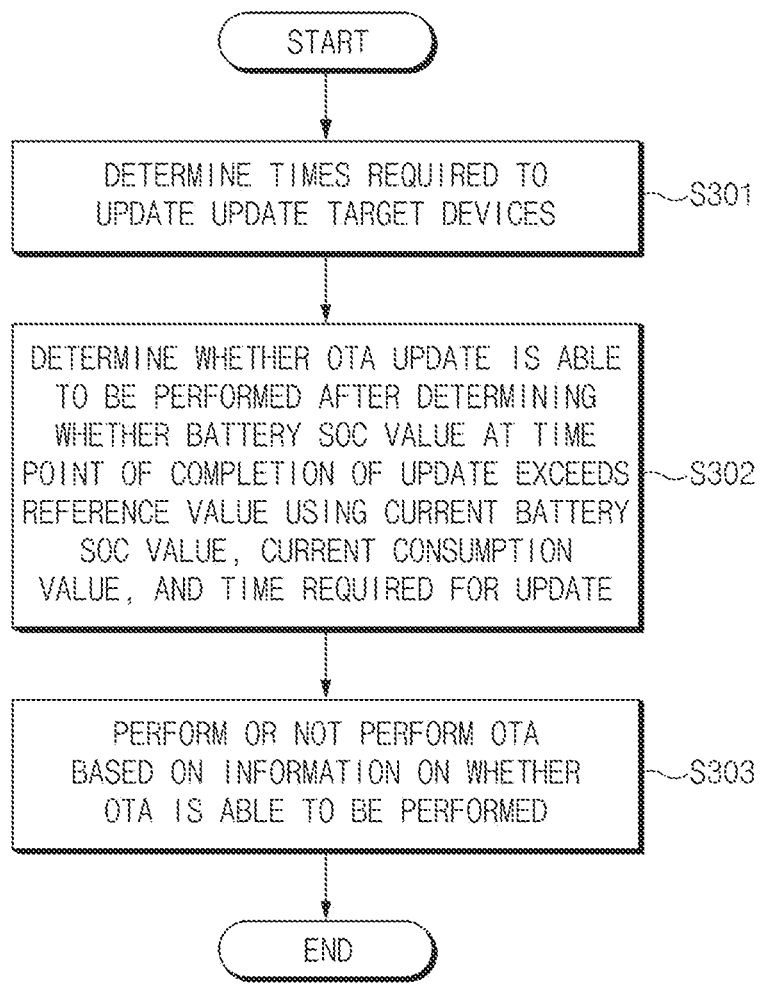
FIG. 3 is a flowchart illustrating determining of whether to perform OTA update by a vehicle update control device, according to an embodiment of the present disclosure.

FIG. 3 is a flowchart illustrating determining of whether to perform OTA update by a vehicle update control device, according to an embodiment of the present disclosure.

Referring to FIG. 3, the vehicle update control device 100 may determine times required to update target devices (S301).

For example, the CCU 221 may identify the update target devices when the vehicle is in the key-off state, calculate a total time required for the update of the update target devices, and transmit information on the calculated total time required for the update to the ICU 222.

The vehicle update control device 100 may determine the times required to update the update target devices (S301), and then, determine whether the OTA update is able to be performed after determining whether the battery SOC value at the time point of the completion of the update exceeds the reference value using the current battery SOC value, the current consumption value, and the time required for the update (S302).

For example, the ICU 222 may calculate the battery SOC value at the time point of the completion of the update using the current battery SOC value, the current consumption value, and the time required for the update, may determine that the OTA update is able to be performed when the calculated battery SOC value at the time point of the completion of the update exceeds the reference value, and may determine that the OTA update is not able to be performed when the calculated battery SOC value at the time point of the completion of the update does not exceed the reference value.

In addition, the ICU 222 may transmit information on whether the OTA update is able to be performed that is determined to the CCU 221.

The vehicle update control device 100 may determine whether the OTA update is able to be performed after determining whether the battery SOC value at the time point of the completion of the update exceeds the reference value using the current battery SOC value, the current consumption value, and the time required for the update (S302), and then, perform or not perform the OTA based on the information on whether the OTA update is able to be performed (S303).

For example, the CCU 221 may perform the OTA update when it is determined that the OTA update is able to be performed based on whether the OTA is able to be performed received from the ICU 222.

Hereinafter, it is assumed that the vehicle update control device 100 in FIG. 1 performs processes in FIGS. 4 to 6. In addition, in a description of FIGS. 4 to 6, operations described as being performed by the vehicle update control device 100 may be understood as being controlled by the controller 120 of the vehicle update control device 100.

Figure 4:
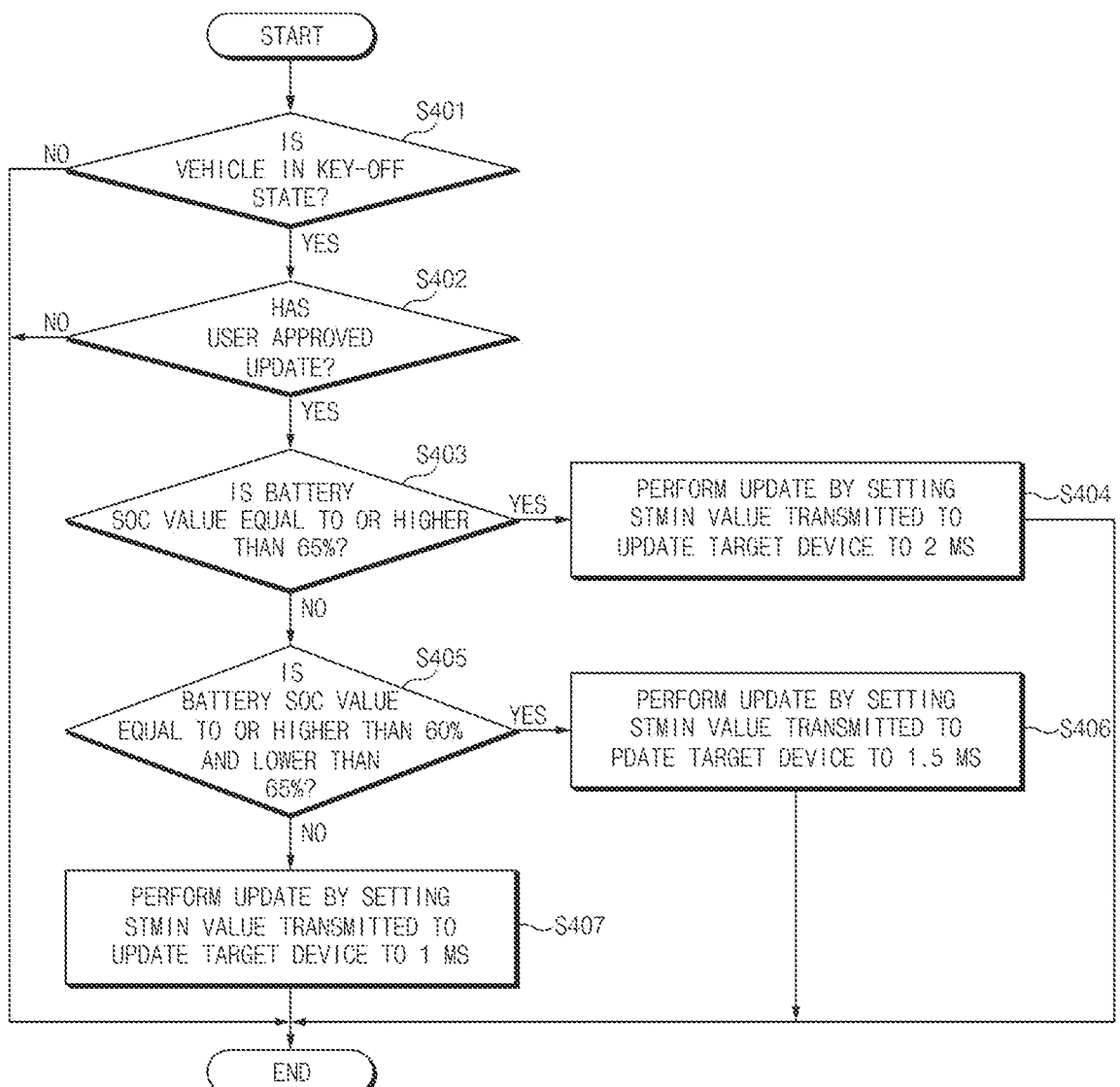
FIG. 4 is a flowchart illustrating a process in which a vehicle update control device operates for OTA update of a default scheme, according to an embodiment of the present disclosure.

FIG. 4 is a flowchart illustrating a process in which a vehicle update control device operates for OTA update of a default scheme, according to an embodiment of the present disclosure.

Referring to FIG. 4, the vehicle update control device 100 may determine whether the vehicle is in the key-off state (S401).

For example, the vehicle update control device 100 may obtain information on whether the vehicle is in the key-off state through the internal communication of the vehicle.

After determining whether the vehicle is in the key-off state (S401), when it is determined that the vehicle is in the key-off state, the vehicle update control device 100 may determine whether a user has approved the update (S402).

For example, the vehicle update control device 100 may obtain information on whether the user has inputted the update approval through the internal communication of the vehicle through a user interface (UI) included in a device such as an AVN (Audio, Video, Navigation) of the vehicle.

After determining whether the user has approved the update (S402), when it is determined that the user has approved the update, the vehicle update control device 100 may determine whether the battery SoC value is greater than or equal to 65% (S403).

For example, the vehicle update control device 100 may determine whether the value of the state of charge of the battery transmitted from the ICU to the CCU is greater than or equal to 65%.

In this connection, the percentage of 65% is arbitrarily determined to give an example. In practice, the percentage may be determined to a different percentage value.

In addition, the same content may be applied even in a case of "exceeding" according to an embodiment of the present disclosure, without being limited to the word "equal to or higher".

After determining whether the battery SoC value is greater than or equal to 65% (S403), when it is determined that the battery SoC value is greater than or equal to 65%, the vehicle update control device 100 may perform the update by setting a STMin value transmitted to the update target device to 2 ms (S404).

For example, the vehicle update control device 100 may perform the update by setting a STMin value for the information transmitted between the CCU and the update target device to 2 ms.

In this connection, the time interval of 2 ms is arbitrarily determined to give an example. In fact, the time interval may be determined to another time interval.

After determining whether the battery SoC value is greater than or equal to 65% (S403), when it is determined that the battery SoC value is not greater than or equal to 65%, the vehicle update control device 100 may determine whether the battery SoC value is greater than or equal to 60% and lower than 65% (S405).

For example, the vehicle update control device 100 may determine whether the value of the state of charge of the battery transmitted from the ICU to the CCU is greater than or equal to 60% and lower than 65%.

In this connection, the percentage of 60% is arbitrarily determined to give an example. In practice, the percentage may be determined to a different percentage value.

In addition, the same content may be applied even in a case of "equal to or lower than" according to an embodiment of the present disclosure, without being limited to the word "lower than".

After determining whether the battery SoC value is greater than or equal to 60% and lower than 65% (S405), when it is determined that the battery SoC value is greater than or equal to 60% and lower than 65%, the vehicle update control device 100 may perform the update by setting the STMin value transmitted to the update target device to 1.5 ms (S406).

For example, the vehicle update control device 100 may perform the update by setting the STMin value for the information transmitted between the CCU and the update target device to 1.5 ms.

In this connection, the time interval of 1.5 ms is arbitrarily determined to give an example. In fact, the time interval may be determined to another time interval.

After determining whether the battery SoC value is greater than or equal to 60% and lower than 65% (S405), when it is determined that the battery SoC value is not greater than or equal to 60% and lower than 65%, the vehicle update control device 100 may perform the update by setting the STMin value transmitted to the update target device to 1 ms (S407).

For example, the vehicle update control device 100 may perform the update by setting the STMin value for the information transmitted between the CCU and the update target device to 1 ms.

In this connection, the time interval of 1 ms is arbitrarily determined to give an example. In fact, the time interval may be determined to another time interval.

Figure 5:
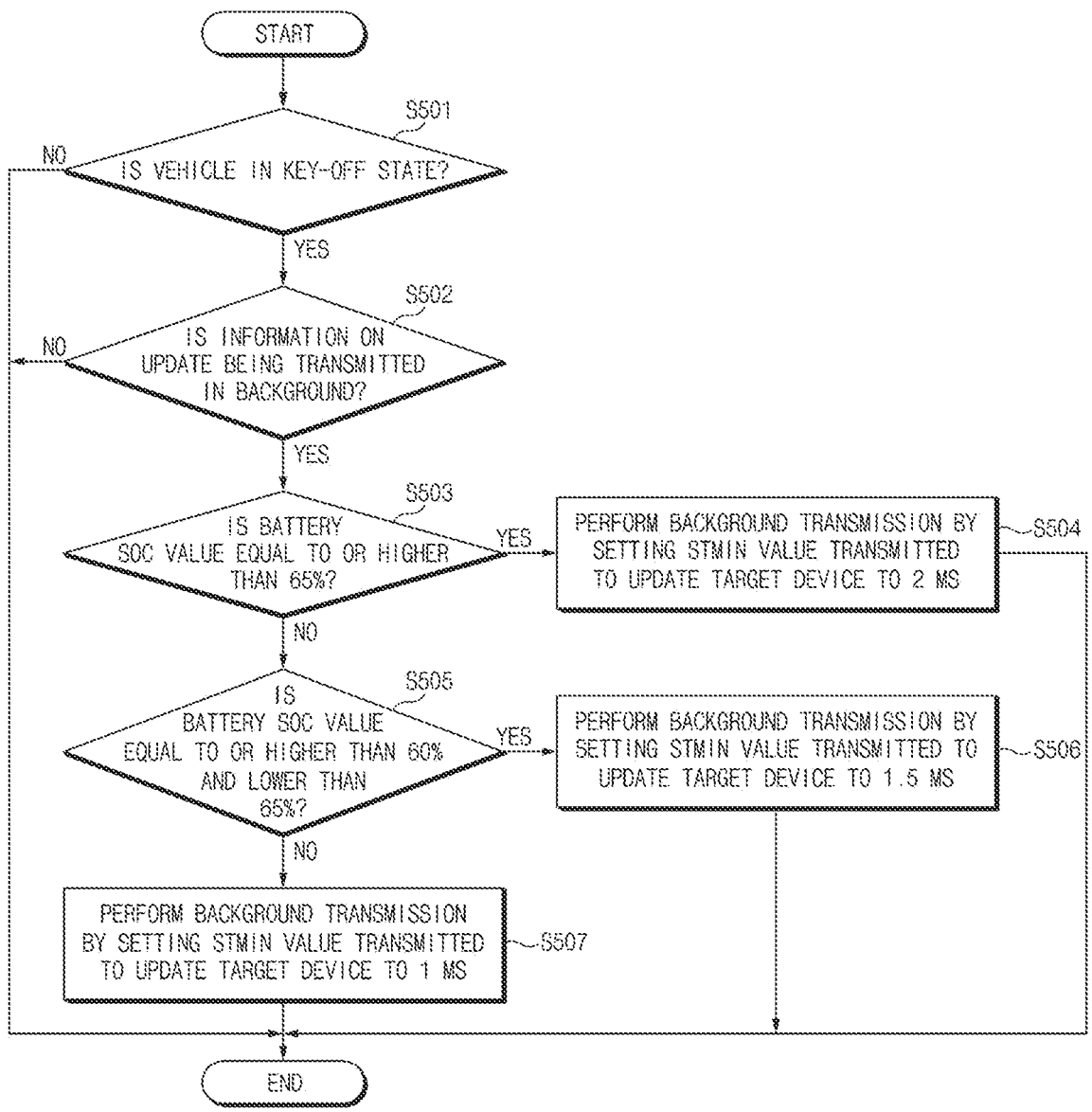
FIG. 5 is a flowchart illustrating a process in which a vehicle update control device operates for OTA update of a memory duplication scheme, according to an embodiment of the present disclosure.

FIG. 5 is a flowchart illustrating a process in which a vehicle update control device operates for OTA update of a memory duplication scheme, according to an embodiment of the present disclosure.

Referring to FIG. 5, the vehicle update control device 100 may determine whether the vehicle is in the key-off state (S501).

The process of S501 is the same as the process of S401 in FIG. 4, so that a description thereof will be omitted.

After determining whether the vehicle is in the key-off state (S501), when it is determined that the vehicle is in the key-off state, the vehicle update control device 100 may determine whether the information on the update is being transmitted in the background to the update target device (S502).

For example, the vehicle update control device 100 may obtain information on whether the information on the update is being transmitted in the background to the update target device through the internal communication of the vehicle.

After determining whether the information on the update is being transmitted in the background to the update target device (S502), when it is determined that the information on the update is being transmitted in the background to the update target device, the vehicle update control device 100 may determine whether the battery SoC value is greater than or equal to 65% (S503).

The process of S503 is the same as the process of S403 in FIG. 4, so that a description thereof will be omitted.

After determining whether the battery SoC value is greater than or equal to 65% (S503), when it is determined that the battery SoC value is greater than or equal to 65%, the vehicle update control device 100 may perform the background transmission by setting the STMin value transmitted to the update target device to 2 ms (S504).

For example, the vehicle update control device 100 may perform the update by setting a STMin value for the information transmitted through the background communication between the CCU and the update target device to 2 ms.

In this connection, the time interval of 2 ms is arbitrarily determined to give an example. In fact, the time interval may be determined to another time interval.

After determining whether the battery SoC value is greater than or equal to 65% (S503), when it is determined that the battery SoC value is not greater than or equal to 65%, the vehicle update control device 100 may determine whether the battery SoC value is greater than or equal to 60% and lower than 65% (S505).

The process of S505 is the same as the process of S405 in FIG. 4, so that a description thereof will be omitted.

After determining whether the battery SoC value is greater than or equal to 60% and lower than 65% (S505), when it is determined that the battery SoC value is greater than or equal to 60% and lower than 65%, the vehicle update control device 100 may perform the background transmission by setting the STMin value transmitted to the update target device to 1.5 ms (S506).

For example, the vehicle update control device 100 may perform the update by setting the STMin value for the information transmitted through the background communication between the CCU and the update target device to 1.5 ms.

In this connection, the time interval of 1.5 ms is arbitrarily determined to give an example. In fact, the time interval may be determined to another time interval.

After determining whether the battery SoC value is greater than or equal to 60% and lower than 65% (S505), when it is determined that the battery SoC value is not greater than or equal to 60% and lower than 65%, the vehicle update control device 100 may perform the background transmission by setting the STMin value transmitted to the update target device to 1 ms (S507).

For example, the vehicle update control device 100 may perform the update by setting the STMin value for the information transmitted through the background communication between the CCU and the update target device to 1 ms.

In this connection, the time interval of 1 ms is arbitrarily determined to give an example. In fact, the time interval may be determined to another time interval.

Figure 6:
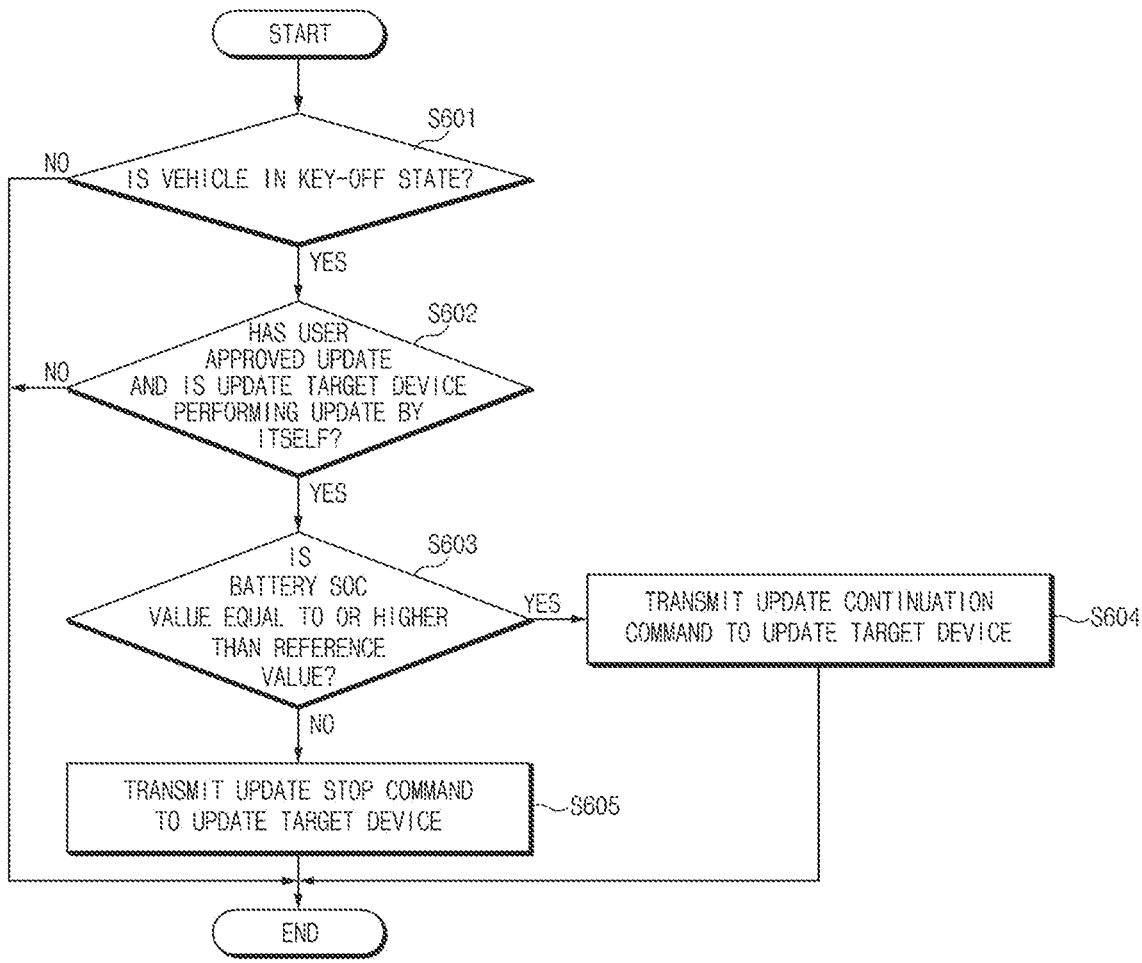
FIG. 6 is a flowchart illustrating a process in which a vehicle update control device operates for OTA update of a differential scheme, according to an embodiment of the present disclosure.

FIG. 6 is a flowchart illustrating a process in which a vehicle update control device operates for OTA update of a differential scheme, according to an embodiment of the present disclosure.

Referring to FIG. 6, the vehicle update control device 100 may determine whether the vehicle is in the key-off state (S601).

The process of S601 is the same as the process of S401 in FIG. 4, so that a description thereof will be omitted.

After determining whether the vehicle is in the key-off state (S601), when it is determined that the vehicle is in the key-off state, the vehicle update control device 100 may determine whether the user has approved the update and the update target device is performing the update by itself (S602).

For example, the vehicle update control device 100 may obtain the information on whether the user has inputted the update approval through the UI included in the device such as the AVN of the vehicle through the internal communication of the vehicle.

For example, the vehicle update control device 100 may obtain information on whether the update target device is performing the update by itself through the internal communication of the vehicle.

After determining whether the user has approved the update, and the update target device is performing the update by itself (S602), the vehicle update control device 100 may determine whether the battery SoC value is greater than or equal to the reference value (S603).

For example, the vehicle update control device 100 may determine whether the value of the state of charge of the battery transmitted from the ICU to the CCU is greater than or equal to the reference value.

In addition, the same content may be applied even in a case of "exceeding" according to an embodiment of the present disclosure, without being limited to the word "equal to or higher".

After determining whether the battery SoC value is greater than or equal to the reference value (S603), when it is determined that the battery SoC value is greater than or equal to the reference value, the vehicle update control device 100 may transmit an update continuation command to the update target device (S604).

For example, when it is determined that the battery SoC value is greater than or equal to the reference value, the CCU may transmit the update continuation command to the update target device.

After determining whether the battery SoC value is greater than or equal to the reference value (S603), when it is determined that the battery SoC value is not greater than or equal to the reference value, the vehicle update control device 100 may transmit the update stop command to the update target device (S605).

For example, when it is determined that the battery SoC value is not greater than or equal to the reference value, the CCU may transmit the update stop command to the update target device.

Figure 7:
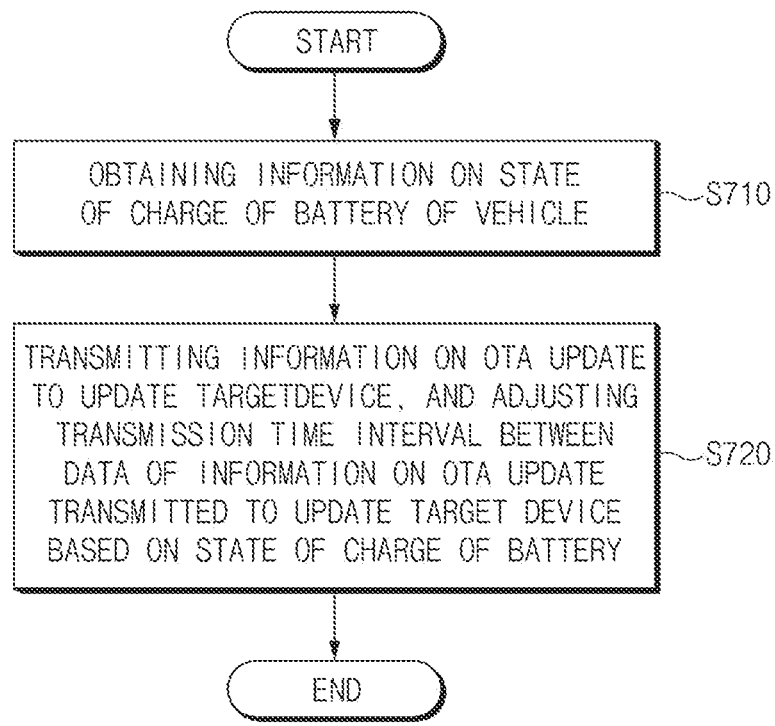
FIG. 7 is a flowchart illustrating a vehicle update control method according to an embodiment of the present disclosure.

FIG. 7 is a flowchart illustrating a vehicle update control method according to an embodiment of the present disclosure.

Referring to FIG. 7, a vehicle update control method may include obtaining the information on the state of charge of the battery of the vehicle (S710), and transmitting the information on the OTA update to the update target device, and adjusting the transmission time interval between the data of the information on the OTA update transmitted to the update target device based on the state of charge of the battery (S720).

The obtaining of the information on the state of charge of the battery of the vehicle (S710) may be performed through the sensors 110 and 210.

The transmitting of the information on the OTA update to the update target device, and adjusting of the transmission time interval between the data of the information on the OTA update transmitted to the update target device based on the state of charge of the battery (S720) may be performed through the controllers 120 and 220.

For example, the adjusting of the transmission time interval between the data of the information on the OTA update transmitted to the update target device (S720) may include adjusting, by the controllers 120 and 220, the transmission time interval to be smaller as the state of charge of the battery is lower.

For example, the adjusting of the transmission time interval between the data of the information on the OTA update transmitted to the update target device (S720) may include adjusting, by the controllers 120 and 220, the transmission time interval based on the state of charge of the battery identified in real time during the OTA update while the vehicle is in the key-off state or the state of charge of the battery of the vehicle expected at the time point of the completion of the OTA update.

For example, the adjusting of the transmission time interval between the data of the information on the OTA update transmitted to the update target device (S720) may include transmitting, by the controllers 120 and 220, the information on the OTA update including the ROM data to the update target device through the background transmission before the OTA update is performed, and adjusting the transmission time interval based on the state of charge of the battery identified in real time when the vehicle comes into the key-off state during the transmission of the information on the OTA update.

For example, the vehicle update control method may further include calculating, by the controllers 120 and 220, the state of charge of the battery of the vehicle expected at the time point of the completion of the OTA update based on the current state of charge of the battery of the vehicle, the current consumed for the OTA update, and the expected time required for the OTA update.

For example, the vehicle update control method may further include determining, by the controllers 120 and 220, whether the starting of the vehicle is possible at the time point of the completion of the OTA update through the state of charge of the battery before the OTA update is performed, and determining, by the controllers 120 and 220, whether it is possible to perform the OTA update based on whether the starting of the vehicle is possible after the OTA update is completed.

For example, the vehicle update control method may further include determining, by the controllers 120 and 220, whether to stop the OTA update based on the state of charge of the battery of the identified in real time during the OTA update while the vehicle is in the key-off state or the state of charge of the battery of the vehicle expected at the time point of the completion of the OTA update.

For example, the vehicle update control method may further include determining, by the controllers 120 and 220, whether the state of charge of the battery of the vehicle expected at the time point of the completion of the OTA update is greater than or equal to the preset reference value after the transmission of the information on the OTA update through the background transmission is completed, and setting, by the controllers 120 and 220, the memory of the update target device in which the ROM data is stored as the operating memory of the vehicle when the state of charge of the battery of the vehicle is greater than or equal to the preset reference value.

For example, the vehicle update control method may further include determining, by the controllers 120 and 220 whether to stop the OTA update based on the state of charge of the battery when the OTA update is performed, using the difference data stored in the update target device.

The operations of the method or the algorithm described in connection with the embodiments disclosed herein may be embodied directly in hardware or a software module executed by the processor, or in a combination thereof. The software module may reside on a storage medium (that is, the memory and/or the storage) such as a RAM, a flash memory, a ROM, an EPROM, an EEPROM, a register, a hard disk, a removable disk, and a CD-ROM.

The exemplary storage medium is coupled to the processor, which may read information from, and write information to, the storage medium. In another method, the storage medium may be integral with the processor. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

Effects of the device and the method for controlling the update of the vehicle according to the present disclosure are as follows.

According to at least one of the embodiments of the present disclosure, the device and the method for controlling the update of the vehicle that control the OTA update of the vehicle may be provided.

In addition, according to at least one of the embodiments of the present disclosure, the device and the method for controlling the update of the vehicle for preventing the situation in which the starting of the vehicle is impossible because of the lack of the capacity of the battery after performing the OTA update may be provided.

In addition, according to at least one of the embodiments of the present disclosure, the device and the method for controlling the update of the vehicle for managing the residual capacity of the battery when performing the update in the situation in which the battery is aged or the battery performance deteriorates in winter may be provided.

In addition, according to at least one of the embodiments of the present disclosure, the device and the method for controlling the update of the vehicle that solve the problem that the efficiency of the OTA update may decrease because the OTA entry condition is not satisfied when the battery residual capacity value is increased during the OTA update.

In addition, according to at least one of the embodiments of the present disclosure, the device and the method for controlling the update of the vehicle that may solve the problem that the starting of the vehicle is impossible after the OTA update is completed only by modifying the software without changing the hardware.

In addition, various effects that are directly or indirectly identified through this document may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for controlling an update of a vehicle, the device comprising:
a sensor disposed in the vehicle performing an over-the-air (OTA) update, wherein the sensor obtains information on a state of charge of a battery of the vehicle; and
a controller configured to:
transmit information on the OTA update to an update target device; and
adjust a transmission time interval between data of the information on the OTA update transmitted to the update target device,
wherein the controller controls controller area network (CAN) communication, CAN with flexible data rate (CAN-FD) communication, and Ethernet communication inside the vehicle to transmit the information on the OTA update to the update target device,
wherein the controller is configured to reduce the transmission time interval as the state of charge of the battery is reduced, and
wherein the controller is configured to perform the OTA update upon determining that starting of the vehicle is possible after the OTA update is performed with the reduced transmission time interval.

2. The device of claim 1, wherein the controller is configured to adjust the transmission time interval based on the state of charge of the battery identified in real time while the OTA update is performed in a key-off state of the vehicle.

3. The device of claim 1, wherein the controller is configured to adjust the transmission time interval while the OTA update is performed in a key-off state of the vehicle based on the state of charge of the battery of the vehicle expected at a time point of completion of the OTA update.

4. The device of claim 3, wherein the controller is configured to calculate the state of charge of the battery of the vehicle expected at the time point of the completion of the OTA update based on a current state of charge of the battery of the vehicle, a current consumed for the OTA update, and an expected time required for the OTA update.

5. The device of claim 1, wherein the controller is configured to:
determine whether starting of the vehicle is possible at a time point of completion of the OTA update through the state of charge of the battery before the OTA update is performed; and
determine whether the OTA update is able to be performed based on whether the starting of the vehicle is possible after the OTA update is completed.

6. The device of claim 1, wherein the controller is configured to determine whether to stop the OTA update based on the state of charge of the battery identified in real time while the OTA update is performed in a key-off state of the vehicle, or the state of charge of the battery of the vehicle expected at a time point of completion of the OTA update.

7. The device of claim 1, wherein the controller is configured to:
transmit the information on the OTA update including read only memory (ROM) data to the update target device through background transmission before the OTA update is performed; and
adjust the transmission time interval based on the state of charge of the battery identified in real time when the vehicle comes into a key-off state during the transmission of the information on the OTA update.

8. The device of claim 7, wherein the controller is configured to:
determine whether the state of charge of the battery of the vehicle expected at a time point of completion of the OTA update is greater than or equal to a preset reference value after the transmission of the information on the OTA update through the background transmission is completed; and
set a memory of the update target device where the ROM data is stored as an operating memory of the vehicle when the state of charge of the battery of the vehicle is greater than or equal to the preset reference value.

9. The device of claim 1, wherein the controller is configured to determine whether to stop the OTA update based on the state of charge of the battery when the OTA update is performed using difference data stored in the update target device.

10. The device of claim 9, wherein the controller is configured to stop the OTA update when the state of charge of the battery is lower than a preset reference value when the OTA update is performed using the difference data stored in the update target device.

11. A method for controlling an update of a vehicle, the method comprising:
obtaining, by a sensor disposed in the vehicle performing an over-the-air (OTA) update, information on a state of charge of a battery of the vehicle; and
transmitting, by a controller, information on the OTA update to an update target device, and adjusting a transmission time interval between data of the information on the OTA update transmitted to the update target device;
wherein the controller controls controller area network (CAN) communication, CAN with flexible data rate (CAN-FD) communication, and Ethernet communication inside the vehicle to transmit the information on the OTA update to the update target device,
wherein the adjusting, by the controller, of the transmission time interval between the data of the information on the OTA update transmitted to the update target device includes:
reducing, by the controller, the transmission time interval as the state of charge of the battery is reduced, and
wherein the controller is configured to perform the OTA update upon determining that starting of the vehicle is possible after the OTA update is performed with the reduced transmission time interval.

12. The method of claim 11, wherein the adjusting, by the controller, of the transmission time interval between the data of the information on the OTA update transmitted to the update target device includes:
adjusting, by the controller, the transmission time interval based on the state of charge of the battery identified in real time while the OTA update is performed in a key-off state of the vehicle, or the state of charge of the battery of the vehicle expected at a time point of completion of the OTA update.

13. The method of claim 12, further comprising:
calculating, by the controller, the state of charge of the battery of the vehicle expected at the time point of the completion of the OTA update based on a current state of charge of the battery of the vehicle, a current consumed for the OTA update, and an expected time required for the OTA update.

14. The method of claim 11, further comprising:
- determining, by the controller, whether starting of the vehicle is possible at a time point of completion of the OTA update through the state of charge of the battery before the OTA update is performed; and
- determining, by the controller, whether the OTA update is able to be performed based on whether the starting of the vehicle is possible after the OTA update is completed.

15. The method of claim 11, further comprising:
- determining, by the controller, whether to stop the OTA update based on the state of charge of the battery identified in real time while the OTA update is performed in a key-off state of the vehicle, or the state of charge of the battery of the vehicle expected at a time point of completion of the OTA update.

16. The method of claim 11, wherein the adjusting, by the controller, of the transmission time interval between the data of the information on the OTA update transmitted to the update target device includes:
- transmitting, by the controller, the information on the OTA update including read only memory (ROM) data to the update target device through background transmission before the OTA update is performed, and adjusting the transmission time interval based on the state of charge of the battery identified in real time when the vehicle comes into a key-off state during the transmission of the information on the OTA update.

17. The method of claim 16, further comprising:
- determining, by the controller, whether the state of charge of the battery of the vehicle expected at a time point of completion of the OTA update is greater than or equal to a preset reference value after the transmission of the information on the OTA update through the background transmission is completed; and
- setting, by the controller, a memory of the update target device where the ROM data is stored as an operating memory of the vehicle when the state of charge of the battery of the vehicle is greater than or equal to the preset reference value.

18. The method of claim 11, further comprising:
- determining, by the controller, whether to stop the OTA update based on the state of charge of the battery when the OTA update is performed using difference data stored in the update target device.

* * * * *